United States Patent
Clissold et al.

(10) Patent No.: US 9,513,978 B2
(45) Date of Patent: *Dec. 6, 2016

(54) INTEGRATED SUPPORT FOR APPLICATION PORTING TRANSPARENCY AND STREAMLINED SYSTEM MIGRATION IN HETEROGENEOUS PLATFORM ENVIRONMENTS

(71) Applicant: International Business Machines Corporation, Armonk, NY (US)

(72) Inventors: David N. Clissold, Austin, TX (US); Su Liu, Austin, TX (US); Priya Paul, Austin, TX (US); Jun Su, Beijing (CN); Fan Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/516,604

(22) Filed: Oct. 17, 2014

(65) Prior Publication Data

US 2016/0110232 A1  Apr. 21, 2016

(51) Int. Cl.
*G06F 3/00* (2006.01)
*G06F 9/54* (2006.01)
*G06F 9/46* (2006.01)

(52) U.S. Cl.
CPC .............. *G06F 9/541* (2013.01); *G06F 9/466* (2013.01)

(58) Field of Classification Search
CPC .................................. G06F 9/54; G06F 9/541
USPC ........................................................ 719/319
See application file for complete search history.

(56) References Cited

U.S. PATENT DOCUMENTS

| | | | | |
|---|---|---|---|---|
| 5,953,514 A | * | 9/1999 | Gochee | G06F 9/547 703/13 |
| 6,076,090 A | * | 6/2000 | Burroughs | G06F 9/4435 707/792 |
| 6,247,067 B1 | * | 6/2001 | Berliner | G06F 9/45537 719/321 |
| 6,999,082 B2 | | 2/2006 | Nishimura | |
| 7,199,729 B2 | | 4/2007 | Chen et al. | |
| 7,215,264 B2 | | 5/2007 | Salwan et al. | |

(Continued)

OTHER PUBLICATIONS

Cozzi, Converting Between Character sets, Feb. 28, 2006.*

(Continued)

*Primary Examiner* — Lechi Truong
(74) *Attorney, Agent, or Firm* — David Zwick

(57) ABSTRACT

Converting data for an application ported from an operating system (OS) platform of a first computer to an OS platform of a second computer. Configuration information associated with ported application including the first computer's OS platform is stored on the second computer. The ported application executing on the second computer receives first data encoded in a first code set. The OS of the second computer receives a request to convert the first data to a second data encoded in a second code set, locates a first-code-set-to-second-code-set mapping based on at least maintained code set mappings of the OS of the first computer, and converts the first data to the second data using the located first-code-set-to-second-code-set mapping. The second data is compatible for processing on the second computer and output from converting the data on the second computer is equivalent to an output from converting the data on the first computer.

12 Claims, 3 Drawing Sheets

(56) References Cited

U.S. PATENT DOCUMENTS

| | | | |
|---|---|---|---|
| 7,274,314 B2 | 9/2007 | Maeda et al. | |
| 7,278,100 B1 | 10/2007 | Ehrman | |
| 7,703,004 B2 | 4/2010 | Bier | |
| 7,970,801 B1* | 6/2011 | Defrang | G06F 9/541 |
| | | | 707/809 |
| 7,970,836 B1* | 6/2011 | Cooley | G06Q 20/10 |
| | | | 705/26.1 |
| 8,704,687 B2 | 4/2014 | Clissold et al. | |
| 2005/0120122 A1* | 6/2005 | Farnham | H04L 69/32 |
| | | | 709/230 |
| 2005/0184886 A1* | 8/2005 | Fauque | G06F 17/2217 |
| | | | 341/50 |
| 2008/0059875 A1 | 3/2008 | Ishizaki et al. | |
| 2012/0054467 A1* | 3/2012 | Fulton | G06F 17/30949 |
| | | | 711/216 |

OTHER PUBLICATIONS

Kenneth Chiu, Investigating the Limits of SOAP Performance for Scientific Computing, 2002.*

Alur et al, "LinkIntegrity+ : A Web Asset Integrity Solution," IBM Almaden Research Center, 650 Harry Road, San Jose, CA 95120. no date lc.

Foller, "Online sample of a CharSet property for conversion texts and files," Online charset/codepage conversion, p. 1-2, motobit. com/util/charset-codepage-conversion.asp, Accessed on Jul. 22, 2014.

GNU Project—Free Software Foundation (FSF), "libiconv," GNU. org, Last updated: Aug. 7, 2011, p. 1-5, gnu.org/software/libiconv/, Accessed on Jul. 22, 2014.

IBM, "iconv Subroutine," IBM Knowledge Center, p. 1-2, 01.ibm. com/support/knowledgecenter/ssw_aix_71/com.ibm.aix.basetrf1/ iconv.htm, Accessed on Jul. 22, 2014.

IBM, "Supported territory codes and code pages," DB2 Version 9.5 for Linux, UNIX, and Windows, p. 1-48, IBM Knowledge Center, 01.ibm.com/support/knowledgecenter/api/content/SSEPGG_9.5.0/ com.ibm.db2.luw.admin.nls.doc/doc/r0004565.html, Accessed on Jul. 22, 2014.

IBM, "uconvdef Command," IBM Knowledge Center, p. 1-2, 01.ibm.com/support/knowledgecenter/api/content/ssw_aix_71/ com.ibm.aix.cmds5/uconvdef.htm, Accessed on Jul. 22, 2014.

IBM, "Use Unicode Services to create conversion tables," z/Os V1R12.0 Migration—All supported migration paths, 2010, p. 1-2, IBM Knowledge Center, 01.ibm.com/support/knowledgecenter/api/ content/SSLTBW_1.12.0/com.ibm.zos.r12.e0zm100/convtbl. htm?locale=en&ro=kcUI, Accessed on Jul. 22, 2014.

SAP, "Conversion of SAP Systems to Unicode," SAP TechEd '06, 2006, p. 1-123, SAP AG 2006, SPC200.

IBM Almaden Research Center, 650 Harry Road, San Jose, CA 95120, Alur et al, "LinkIntegrity+ : A Web Asset Integrity Solution," 10 pages, 2008.

Alvestrand, "IETF Policy on Character Sets and Languages", https://www.ietf.org/rfc/rfc2277.txt, UNINETT, Jan. 1998, pp. 1-9.

IBM, "List of IBM Patents or Patent Applications Treated as Related (Appendix P)," Dec. 16, 2014.

Clissold et al., "Integrated Support for Application Porting Transparency and Streamlined System Migration in Heterogeneous Platform Environments," Filed on Dec. 12, 2014, p. 1-30, U.S. Appl. No. 14/568,201.

U.S. Appl. No. 14/516,604, filed Oct. 17, 2014.
U.S. Appl. No. 14/568,201, filed Dec. 12, 2014.

* cited by examiner

INTEGRATED SUPPORT FOR APPLICATION PORTING TRANSPARENCY AND STREAMLINED SYSTEM MIGRATION IN HETEROGENEOUS PLATFORM ENVIRONMENTS

BACKGROUND

The present disclosure relates generally to multicomputer data transfer and more particularly to information exchange, application porting, and system migration in heterogeneous platform environments.

A code set or coded character set, such as UTF-8 or ISO 8859-1, is a set of rules that defines a human language character set and a one-to-one relationship between each character in the language, for example, alphanumeric characters, and its computer operating system recognized bit pattern. Different operating system platforms, such as Linux®, AIX®, Solaris®, Hewlett-Packard®, and Windows®, may each utilize a different set of standards, versions, and rules (e.g. customization rules) to encode the same human language characters.

Encoded characters may be converted from one encoding to another with code set converters. Code set converters, use first-code-set-to-second-code-set mappings, or code set mappings, that define the relationship between two code sets to map characters encoded in a first code set to the encoding of a second code set. A plurality of code set converters exist to support the multitude of different languages and code set standards worldwide. Code set conversion is an important feature in a multi-national server operating system, especially in an information exchange network in which information crosses geographic locations and operating system platforms.

SUMMARY

Embodiments of the present invention disclose a computer program product and system for converting data for an application that is ported from an operating system (OS) platform of a first computer to an OS platform of a second computer. Configuration information associated with a ported application that includes information corresponding to the OS platform of the first computer is stored on the second computer. The ported application executing on the OS platform of the second computer receives first data encoded in a first code set. The OS platform of the second computer receives a request to convert the first data to a second data encoded in a second code set, locates a first-code-set-to-second-code-set mapping based on at least maintained code set mappings of the OS platform of the first computer, and converts the first data to the second data using the located first-code-set-to-second-code-set mapping, such that the second data is compatible for processing on the OS of the second computer and an output resulting from converting the data on the OS platform of the second computer is equivalent to an output resulting from converting the data on the OS platform of the first computer.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
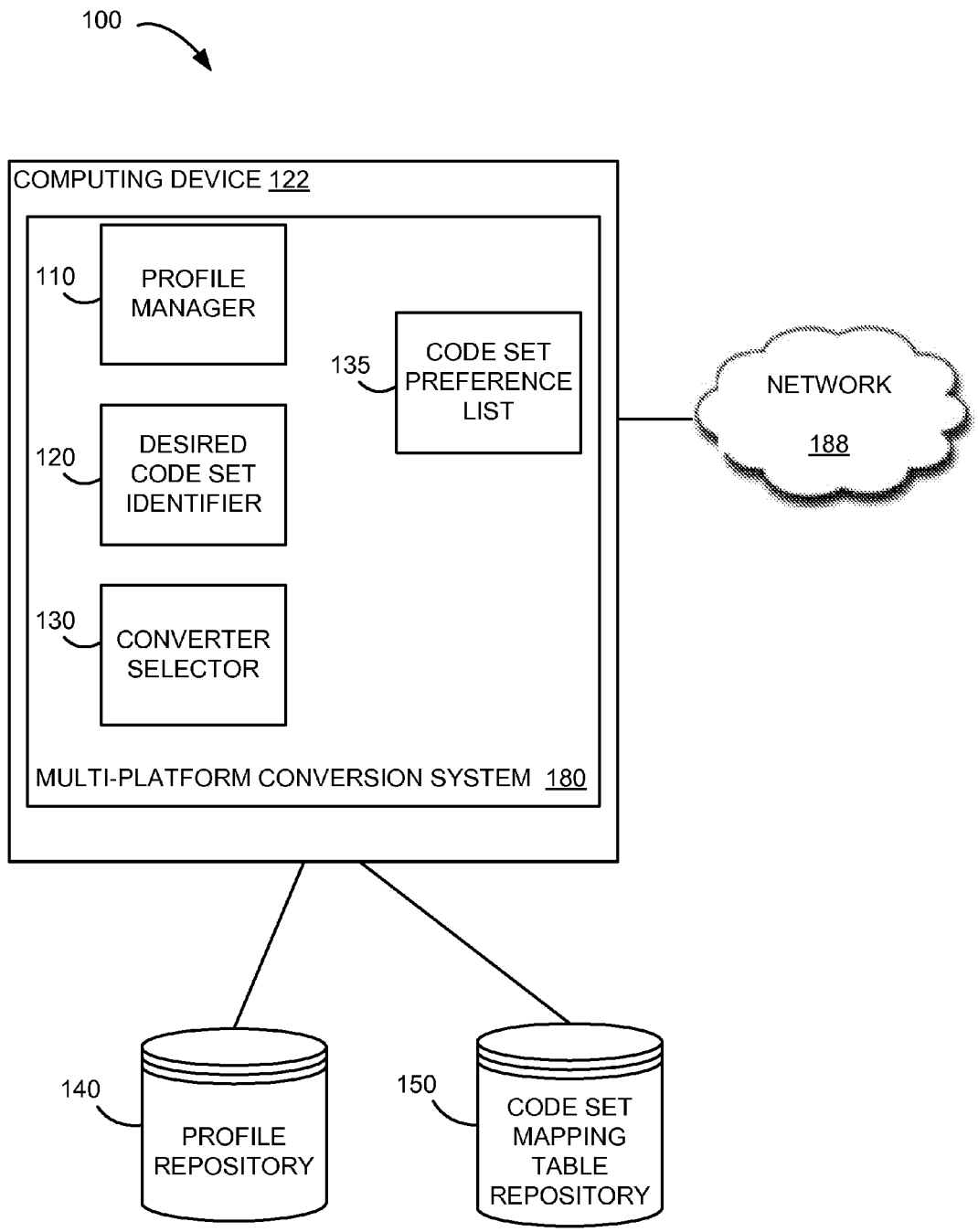
FIG. 1 illustrates a functional block diagram of an information exchange environment, in accordance with an embodiment of the present disclosure.

An information exchange network, such as cluster computing and cloud computing, may include a plurality of computing devices connected together in a network (for example, the Internet, a local area network, a wide area network, or a wireless network) where the plurality of computing devices may execute a heterogeneous plurality of operating systems. The plurality of computing devices in the network may each support different code sets and code set mappings depending, for example, on the computing device's operating system, its system-wide primary language settings, its geographic location, and any customized code sets. Each operating system platform may have its own code set naming conventions and character mapping standards for any particular language. Individual computing devices executing any operating system platform may have specialized code sets to support localization or customization of a language.

Applications executing on a computing device, such as an e-mail server or data base server, may receive information from other computing devices in its information exchange network. Information may include, but is not limited to, message exchanges, data transfers, data base access results, security authentication data, ported application code, migrated data, etc. The received information may originate on any computing device in the information exchange network, which may be executing any of a plurality of operating systems, each operating system supporting a plurality of code sets. The received information may have been encoded by a computing device using code set standards and rules that differ from that of the receiving computing device.

To properly display or use the received information, the receiving computing device may select code set conversion code, or a code set converter, to convert the information into a code set recognized by its operating system. Each of the plurality of network connected computing device operating systems may have its own, native, set of code sets and converters for converting the received information. Each of the plurality of network connected computing device operating systems may, using its native converters, convert the received information differently.

These differences in code sets and code set converters may cause compatibility problems for applications, such as WebSphere® and DB2®, that wish to execute on a plurality of platforms. Compatibility problems may include input and/or output data being converted differently on the different platforms. Porting such applications to a plurality of operating system platforms may require the applications, either internally or through user configuration settings, to identify a code set converter to be used on each platform to which they may be ported. Even when an application identifies a code set converter, consistent conversion cannot be guaranteed if a computing device converts the information using a local version of the identified code set that differs from the standard code set for that operating system platform.

Differing code set conversions on different computing devices may also cause compatibility problems for communication between computing devices when, for example, message exchanges do not convert consistently on all computing devices in the information exchange network and message content becomes unreadable or corrupted because the code set conversions are not equivalent on all the different computing devices.

In addition to the impact on customer and vendor applications that wish to execute on multiple platforms, and on network communications, code set incompatibility may also impact product migration and database replication. Product migration may be impacted, for example, due to the need to manually adjust the migrated product to make it execute properly on a new platform and to provide valid output on the migrated-to platform.

Database replication may be impacted, for example, if replication is attempted from an operating system platform that allows a code set to be specified for each table column, replicated to an operating system platform that only allows a code set to be specified at the database level. That exemplary data base may only be replicatable as a single database in the receiving computing device if all the code sets, for each column in the original database, are the same.

Compatible, or equivalent, information conversion may be critical for information processing and storage systems in a heterogeneous information exchange network computing environment.

Various embodiments of the present disclosure may provide the ability to efficiently locate and load an optimum code set converter that reliably provides compatible information conversion among applications, executing on heterogeneous operating system platforms using disparate code set standards.

In various embodiments of the present disclosure, a computing device operating system may maintain a selection of code set converters from a plurality of operating system platforms, hereinafter "multi-platform code set converters". The operating system, rather than each application, may select a code set converter, from the selection of multi-platform code set converters for received information. The operating system selected code set converter may produce converted output results compatible with the converted output that may have resulted if the information was converted on the originating computing device. Various embodiments may automatically select an optimum code set converter without requiring any modifications to originating applications, allowing for transparent application porting (i.e., without application modification) and streamlined migration in heterogeneous platform environments.

Various embodiments may provide compatible information conversion, without application modification, regardless of which of the plurality of operating system platforms, in a heterogeneous computing network, originated the information exchange.

In various embodiments, a computing device's operating system may provide options that allow users, user groups, and applications to define configuration and environmental values, such as code set preferences, preferred language, preferred geographic location, and originating platform either explicitly or through profile information. The operating system may, in various embodiments, create a history file for each user, user group, and application that may include the user, user group, or application originating platform and all code set conversions requested by the user, user group or application. The history file may be utilized along with the configuration and environmental values provided by a user, user group or application to select an optimum code set converter for that user, user group, or application.

The selected code set converter, hereinafter "converter", may need to be located and loaded before information may be converted. An operating system supporting multi-platform conversion may, in various embodiments, maintain pointers to each platform's converters, for example in directories or in paths. In various embodiments, the operating system may maintain a preferred pool of code set converters, or code set preference list, of frequently used converters for each application or user, from which the operating system may efficiently load an optimum code set converter. In various embodiments, the code set preference list may include pointers to converters. In certain embodiments, the code set preference list may include the conversion code.

In various embodiments in which all operating system platforms support multi-platform conversion, application porting, product migration, and network communications may be transparently and compatibly exchanged across any of the heterogeneous computing devices in an information exchange network. The automatic and transparent compatibility may reduce the complexity of heterogeneous platform porting and migration, and reduce the incompatibility of heterogeneous platform information communication, allowing for reduced application modification when porting an application, reduced preparation when migrating a product or system, and reduced configuration complexity when defining a network.

FIG. 1 illustrates a functional block diagram of an information exchange environment 100, in accordance with an embodiment of the present disclosure. Information exchange environment 100 may include computing device 122, profile repository 140, code set mapping table repository 150, and network 188. Computing device 122 may include a multi-platform conversion system 180, which may include a profile manager 110, a desired code set identifier 120, a converter selector 130, a code set preference list 135, the profile repository 140, and the code set mapping table repository 150, all of which may be stored, for example, on a computer readable storage medium, such as computer readable storage medium (media) 330 (FIG. 3), portable computer readable storage medium (media) 370, and/or RAM(S) 322. The profile repository 140 and code set mapping table repository 150 may be locally attached to computing device 122 or may be externally accessed through network 188 (for example, the Internet, a local area network or other, wide area network or wireless network) and network adapter or interface 336. The network may comprise copper wires, optical fibers, wireless transmission, routers, firewalls, switches, gateway computers, and/or edge servers. Computing device 122 may exchange information, through network 188, with a plurality of heterogeneous computing devices in the network.

Computing device 122 may, in various embodiments, execute multi-platform conversion system 180 to automatically and transparently select, locate, and load an optimum code set converter for an application or user converting information from one code set to another. In various embodiments, converting information from one code set to another may be initiated by an application or user executing a code set converter "open and load" application programming interface (API), such as the "iconv_open" API in UNIX®. Computing device 122 may transparently convert the API input information compatibly with the information's originating platform, regardless of the originating computing device platform, by selecting, locating, and loading an optimum code set converter from a multi-platform repository of code set converters.

Multi-platform conversion system 180 may execute on any operating system platform, for example, Microsoft® Windows®, IBM® AIX®, or Hewlett-Packard® that supports code set conversion. Various embodiments of the present disclosure may determine an optimum code set converter based on profile information obtained about the issuer of the "open and load" API, and on a history of the issuer's "open and load" API usage.

Profile information may be obtained, in various embodiments, by profile manager 110. Profile manager 110 may obtain profile information for applications, users and user groups wishing to port, migrate or exchange communications on computing device 122. Profile information may be obtained when applications, users, and user groups are identified to computing device 122. Profile information may include, but is not limited to, an identifier for the user, user group, application, vendor, etc., a conversion reason code (e.g. ported application, migrated data base), a conversion data information type (e.g. data base, message), a default geographic location, a default language and locale, a default operating system platform, user groups served, and related settings on any connected peer servers in the information exchange network. In certain embodiments, the profile may include a preferred or a customized code set for the user, user group, or application. In various embodiments, profile manager 110 may maintain a history of each user, user group, and application that includes, but is not limited to, an originating platform for ported, migrated or exchanged information, lists of converters selected on prior "open and load" API invocations, a frequency of a converter's selection, and a timestamp for each selection of a converter.

Profile manager 110 may receive profile information from users, user groups, application vendors, and applications themselves through operating system defined profile settings, or indirectly from public knowledge repositories for the user, user group, or application vendor. Profile manager 110 may, in certain embodiments, obtain a pointer, such as a universal resource locator (URL), to a private or public knowledge repository where profile information for that user, user group, application or vendor is maintained.

Profile repository 140, in various embodiments, may include the profile information including, but not limited to, originating platform, primary language, originating geographical location, users served, and specified preferred or customized code sets obtained by profile manager 110. Profile repository 140 may be locally attached to computing device 122 or may be accessible over a private or public network. A public profile repository 140 may, in certain embodiments, include code page preferences and profiles for users, user groups, application vendors, and applications obtained by a plurality of profile managers 110 on a plurality of computing devices 122, each with access to the public profile repository 140.

Desired code set identifier 120 may, in various embodiments, analyze the profile repository 140 built by profile manager 110 for each user, user group, and application managed by profile manager 110 on computing device 122 and determine which of the plurality of code set mapping tables and converters in code set mapping table repository 150, described below, may be preferred converters for that user, user group, or application. Profile manager 110 may initiate the execution of desired code set identifier 120 for each user, user group, application, etc. as they are identified to computing device 122.

Desired code set identifier 120 may create a code set preference list 135 for each user, user group, or application managed by application profile manager 110. Desired code set identifier 120 may, in various embodiments, utilize the profile repository 140 information received by profile manager 110, such as originating platform, primary language, originating geographical location, users served, and specified preferred or customized code sets to select the code set converters to be included in each code set preference list 135. Desired code set identifier 120 may, for example, include converters, for the primary language code sets on the originating platform. The code set preference list 135 may, in various embodiments, be a table, a linked list, or an ordered list of locations, such as paths, to the preferred converters.

Desired code set identifier 120 may search the code set mapping table repository 150, described in more detail below, for the preferred converters to be added to the code set preference list 135. For preferred converters whose code set mapping tables are not already in code set mapping table repository 150, desired code set identifier 120 may search for the code set mapping tables, for example in public vendor code matching table repositories. Desired code set identifier 120 may add the found code set mapping tables to the code set mapping table repository 150, build the converters for the added code set mapping tables, and add them to the code set preference list 135. If no code set mapping tables for the preferred converters can be found, desired code set identifier 120 may identify a default converter to be used instead. The default converter may, in certain embodiments, be multiple converters, such that the first converter converts A→B and the second converter converts B→C, or the default converter may be a converter that uses a standard code page rather than a customized code page.

In various embodiments, the code set preference list 135 may be dynamically updated such that converters, not initially included in the list may be added by desired code set identifier 120, while unused converters may be removed. In various embodiments, the code set preference list 135 may include only the most frequently requested converters by the user, user group, or application. In certain embodiments, code set preference list 135 may only include the most recently requested converters. In various embodiments, the number of converters maintained in the code set preference list 135 may be configurable, as well as the algorithm, such as most recently used or most frequently used, for replacing converters if the list reaches its maximum number of converters. Converter selector 130, described in more detail below, may, in various embodiments, search the code set preference list 135 of the "open and load" API issuer for the selected converter. Locating the selected converter in the code set preference list 135 may enhance the speed of conversion by eliminating the need to search all available converters for the desired converter.

Code set mapping table repository 150 may, in various embodiments, include code set mapping tables from a plurality of operating system platforms. Certain embodiments may pre-build the code set mapping table repository 150 prior to accepting any data for conversion. In various embodiments, multi-platform conversion system 180 may pre-build code set mapping table repository 150 to include all known code set mapping tables for all operating system platforms. These may be obtained, for example, through public vendor code matching table repositories and through the Unicode Consortium. In other embodiments, multi-platform conversion system 180 may pre-build code set mapping table repository 150 to include a subset of known code set mapping tables and may add code set mapping tables as they are identified as preferred code set mapping tables, by desired code set identifier 120.

In various embodiments, multi-platform conversion system 180 may regularly search for new or updated code set mapping tables, for example, from the vendor public repositories, to be added to the code set mapping table repository 150. In certain embodiments, the search interval for new code page mapping tables may be configurable. In certain embodiments, multi-platform conversion system 180 may search for new code set mapping tables when a new computing device, that executes an operating system platform not already in the network, is added to the information exchange network environment 100.

Multi-platform conversion system 180 may use the multi-platform mapping tables, in code set mapping table repository 150, to build converters which may execute on the computing device's 122 operating system. These built converters may convert input from the other platforms compatibly with the other platforms. In various embodiments, multi-platform conversion system 180 may store the built converters, by platform, in separate locations, such as paths, such that they may be efficiently located and loaded when selected for an "open and load" API.

Multi-platform conversion system 180 may maintain one or more code set mapping table repositories 150, one for each platform's code page mapping tables, or may maintain separate paths or directories to each platform's code page mapping tables within a single code page mapping table repository 150. Multi-platform conversion system 180 may also maintain native code page mapping tables in code page mapping table repository 150. Various embodiments may also store the built converters and native converters in the code set mapping table repository 150 along with the code set mapping tables.

Converter selector 130, in various embodiments, may execute each time a user, user group, or application issues an "open and load" API to convert input information. Converter selector 130 may, in various embodiments, select the converter, used to convert the input information, based on the API issuer's profile information and the code sets requested in the API. Converter selector 130 may search the code set preference list 135 of the API issuer to determine if the selected converter is in the list. For selected converters that are in the API issuer's code set preference list 135, converter selector 130 may load the converter and convert the input information. In certain embodiments, converter selector 130 may update a timestamp or activity counter for the selected converter for code set preference list 135 maintenance.

For converters that are not in the API issuer's code set preference list 135, converter selector 130 may search the code set mapping table repository 150 for the selected converter. In certain embodiments, the application originating platform information may be used to limit the code set mapping table repository 150 search to only those converters associated with the originating platform. In certain embodiments, converters for different platforms may be located in different directories or paths and converter selector 130 may readily locate the appropriate path or directory to search. For selected converters that are found in the code set mapping table repository 150, converter selector 130 may load the converter and convert the input information. Converter selector 130 may also add the converter location to the code set preference list 135, for the issuer of the API, and set a timestamp or update an activity counter for the selected converter in the code set preference list 135.

For a selected converter that is not in the code set mapping table repository 150, converter selector 130 may, in certain embodiments, search for the selected converter, for example in public vendor code set mapping table repositories associated with the originating platform. In certain other embodiments, converter selector 130 may select a default converter from the code set preference list 135 or from the code set mapping table repository 150. For converters located via the search, converter selector 130 may add the located code set mapping table to the code set mapping table repository 150, and build a converter for the located mapping table. Converter selector 130 may load the built converter and convert the input information. Converter selector 130 may also add the built converter location to the API issuer's code set preference list 135, and set a timestamp or update an activity counter for the selected converter in the code set preference list 135.

In various embodiments, converter selector 130 may signal profile manager 110 to update the API issuer's history to reflect the selected converter.

Computing device 122 represents a computing device, system or environment, and may be a laptop computer, notebook computer, personal computer (PC), desktop computer, tablet computer, thin client, mobile phone or any other electronic device or computing system capable of performing the required functionality of embodiments of the disclosure. Computing device 122 may include internal and external hardware components, as depicted and described in further detail with respect to FIG. 3. In other various embodiments of the present disclosure, computing device 122 may represent a computing system utilizing clustered computers and components to act as a single pool of seamless resources. In general, computing device 122 is representative of any programmable electronic devices or combination of programmable electronic devices capable of executing machine-readable program instructions in accordance with an embodiment of the disclosure.

Figure 2:
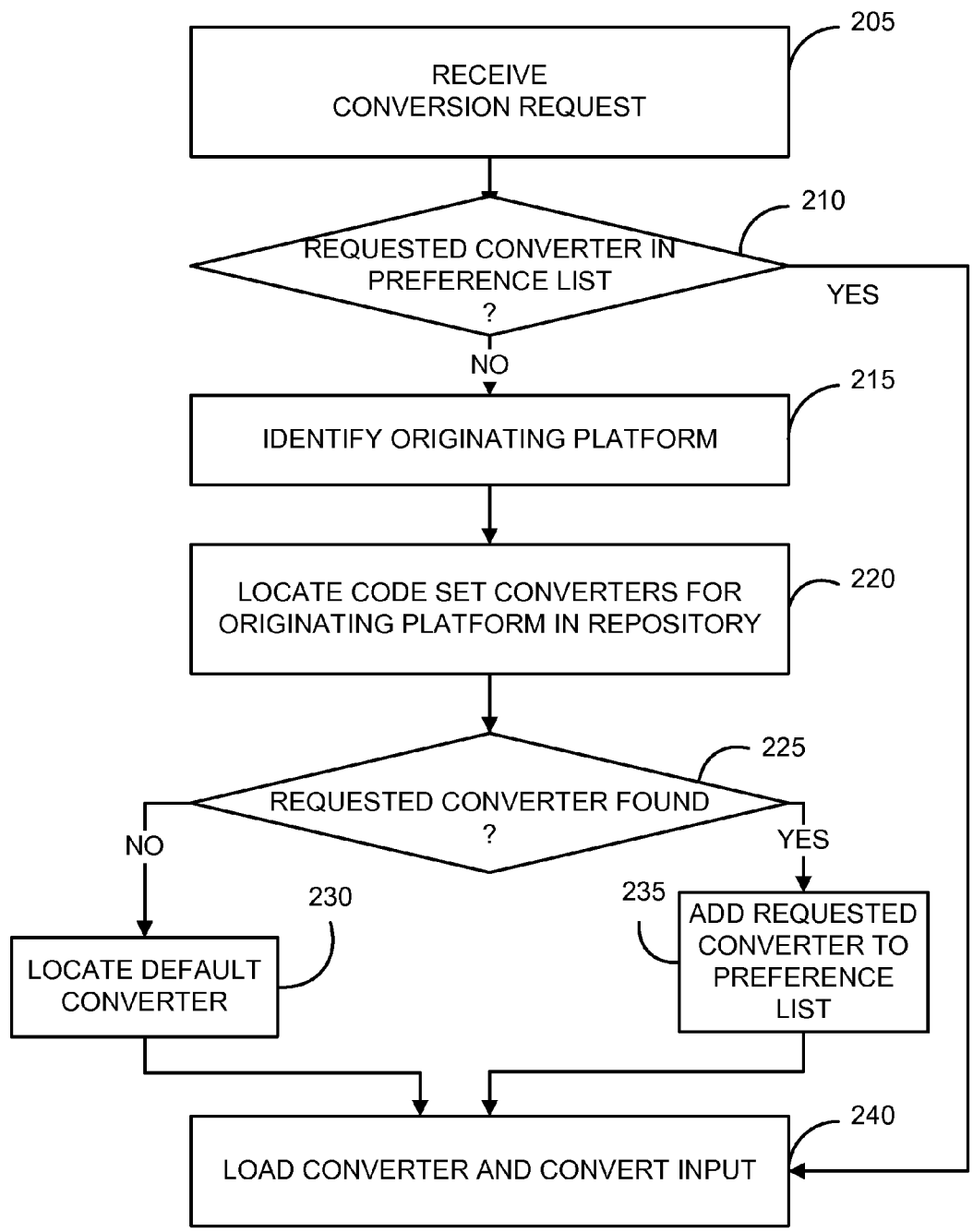
FIG. 2 is a flowchart illustrating the selection of a code set converter in a multi-platform conversion system, in accordance with an embodiment of the disclosure.

FIG. 2 is a flowchart illustrating the selection of a code set converter in a multi-platform conversion system, in accordance with an embodiment of the disclosure. In an exemplary embodiment, an application may be executing in a customer shop on a computer platform that executes with operating system "A." The application may be capable of receiving input data from other computers attached locally or over a network and, as a function of the application, may convert that data for processing on operating system "A."

In an exemplary embodiment, the customer, or the application vendor, may wish to port the application to execute on a different computer platform, a platform that may execute with operating system "B." The application, in various exemplary embodiments, may continue to receive the same input data from the other computers attached locally or over a network after porting to the new platform, and may now convert the data for processing on operating system "B". If the data conversion is inconsistent between the two exemplary operating systems, "A" and "B", the ported application may not function correctly on operating system "B." For example, if Hewlett-Packard® is operating system "A" and AIX® is operating system "B", Japanese input data received by the application may convert inconsistently on the two operating systems because the code sets for the Japanese language on the Hewlett-Packard operating system platform differ from the Japanese language code sets on the AIX operating system platform, even though the code sets are identically named on the two platforms.

The ported application may not need to be aware of these code set inconsistencies if exemplary operating system platform "B" includes integrated support for heterogeneous platform environments. The application may be transparently ported. Without integrated support for heterogeneous platform environments, the ported application may require modification to recognize and handle the code set inconsistencies.

In various embodiments, when the ported application is defined on the ported-to computer operating system (in this exemplary embodiment, operating system "B"), configuration information for the ported application may be stored, including the operating system platform from which the application is porting (in this exemplary embodiment, operating system platform "A").

In various embodiments, after the ported application receives input data that must be converted, the ported application may issue an "open and load" API. In the exemplary embodiment, the "open and load" API may be a request to convert Japanese input data. In various embodiments, converter selector 130, on operating system platform "B", the ported to system which includes integrated support for heterogeneous platform environments, may, at 205, receive the conversion request resulting from the issuance of the "open and load" API. If, in the exemplary embodiment, the conversion request in the API requires a Japanese language converter that is in the code set preference list 135 of the ported application that issued the API, as determined at 210, converter selector 130 may utilize the location information, in the code set preference list 135, to load the selected Japanese language converter and convert the input information, at 240 for continued processing on operating system "B."

If, in the exemplary embodiment, the conversion request resulting from the issuance of the API requires a Japanese language converter that is not in the code set preference list 135 of the ported application, as determined at 210, converter selector 130 may utilize the profile repository 140 to obtain the originating platform of the application issuing the API, at 215 (in this exemplary embodiment operating system "A"). Using location information maintained by the operating system "B", converter selector 130 may, at 220, locate the ported application's originating platform (operating system "A") set of mapping tables in the code set mapping table repository 150. If an operating system "A" Japanese language converter matching the conversion requested by the application in the "open and load" API is found in the code set mapping table repository 150, at 225, converter selector 130 may, at 235, add the found converter location to the code set preference list 135 of the ported application and may, at 240, load the converter and convert the Japanese language input data.

If, in the exemplary embodiment, an operating system "A" Japanese language converter matching the conversion requested by the application in the "open and load" API is not found, at 225, in the code set mapping table repository 150, converter selector 130 may, locate a default converter, at 230, to satisfy the conversion request. The default converter may utilize intermediate conversions to satisfy the conversion request. Converter selector 130 may load the default converter, at 240, and convert the input information.

Figure 3:
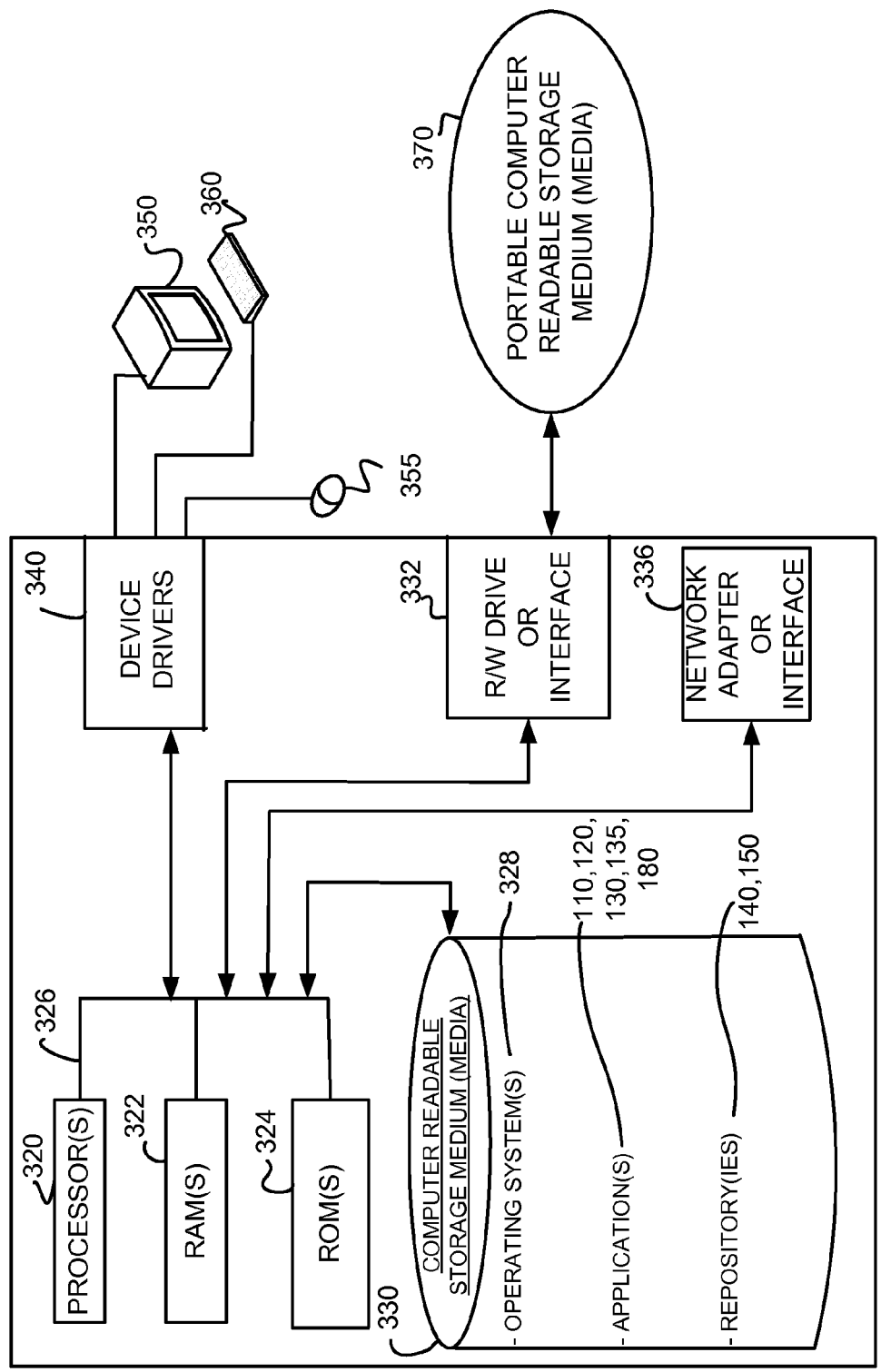
FIG. 3 depicts a block diagram of components of a computing device, in accordance with an embodiment of the disclosure.

FIG. 3 depicts a block diagram of components of computing device 122 of FIG. 1, in accordance with an embodiment of the disclosure. It should be appreciated that FIG. 3 provides only an illustration of one implementation and does not imply any limitations with regard to the environments in which different embodiments may be implemented. Many modifications to the depicted environment may be made.

Computing device 122 can include one or more processors 320, one or more computer-readable RAMs 322, one or more computer-readable ROMs 324, one or more computer readable storage medium 330, device drivers 340, read/write drive or interface 332, and network adapter or interface 336, all interconnected over a communications fabric 326. Communications fabric 326 can be implemented with any architecture designed for passing data and/or control information between processors (such as microprocessors, communications and network processors, etc.), system memory, peripheral devices, and any other hardware components within a system.

One or more operating systems 328, multi-platform conversion systems 180, profile managers 110, desired code set identifiers 120, converter selectors 130, code set preference lists 135, profile repositories 140, and code set mapping table repositories 150 are stored on one or more of the computer-readable storage medium 330 for execution by one or more of the processors 320 via one or more of the respective RAMs 322 (which typically include cache memory). In the illustrated embodiment, each of the computer readable storage medium 330 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer readable storage medium that can store a computer program and digital information.

Computing device 122 can also include a R/W drive or interface 332 to read from and write to one or more portable computer readable storage medium 370. Multi-platform conversion system 180, profile manager 110, desired code set identifier 120, converter selector 130, code set preference list 135, profile repository 140, and code set mapping table repository 150 can be stored on one or more of the portable computer readable storage medium 370, read via the respective R/W drive or interface 332, and loaded into the respective computer readable storage medium 330.

Computing device 122 can also include a network adapter or interface 336, such as a TCP/IP adapter card or wireless communication adapter (such as a 4G wireless communication adapter using OFDMA technology). Multi-platform conversion system 180, profile manager 110, desired code set identifier 120, converter selector 130, code set preference list 135, profile repository 140, and code set mapping table repository 150 can be downloaded to the computing device from an external computer or external storage device via a network (for example, the Internet, a local area network or other, wide area network or wireless network) and network adapter or interface 336. From the network adapter or interface 336, the programs are loaded into the computer readable storage medium 330. The network may comprise copper wires, optical fibers, wireless transmission, routers, firewalls, switches, gateway computers, and/or edge servers.

Computing device 122 can also include a display screen 350, a keyboard or keypad 360, and a computer mouse or touchpad 355. Device drivers 340 interface to display screen 350 for imaging, to keyboard or keypad 360, to computer mouse or touchpad 355, and/or to display screen 350 for pressure sensing of alphanumeric character entry and user selections. The device drivers 340, R/W drive or interface 332, and network adapter or interface 336 can comprise hardware and software (stored in computer readable storage medium 330 and/or ROM 324).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A computer program product for converting character encoded data for an application that is ported from an operating system (OS) platform of a first computer to an OS platform of a second computer, the computer program product comprising one or more computer readable storage medium and program instructions stored on at least one of the one or more computer readable storage medium, the program instructions comprising:

program instructions to receive, on a second computer, an application ported from a first computer, the first and second computers having different first and second OS platforms, respectively;

program instruction to receive by the second computer, configuration information associated with the ported application that includes information corresponding to the first OS platform;

program instructions to execute, by the second OS platform, the ported application;

program instructions to receive, by the ported application, first character data encoded in a first code set;

program instructions to receive, by the second OS platform from the executing ported application, a request to convert the first character encoded data to a second character encoded data encoded in a second code set;

program instructions to locate, by the second OS platform, a first-code-set-to-second-code-set mapping based on at least the received configuration information associated with the ported application; and program instructions to convert, by the second OS platform, the first character encoded data to the second character encoded data using the located first-code-set-to-second-code-set mapping, such that the second character encoded data is equivalent to an output resulting from converting the first character encoded data on the first OS platform.

2. The computer program product according to claim 1, wherein program instructions to locate further comprise program instructions to locate the first-code-set-to-second-code-set mapping from a plurality of first-code-set-to-second-code-set mappings, each first-code-set-to-second-code-set mapping associated with a different OS platform.

3. The computer program product according to claim 2, wherein the different OS platforms include Windows®, Linux®, AIX®, SOLARIS®, and Virtual Machine® (VM).

4. The computer program product according to claim 1, wherein program instructions to locate further comprise program instructions to locate the first-code-set-to-second-code-set mapping from a plurality of first-code-set-to-second-code-set mappings located on one or more network storage devices.

5. The computer program product according to claim 4, wherein the second computer includes a plurality of first-code-set-to-second-code-set mappings comprising:

one or more first-code-set-to-second-code-set mappings associated with the OS platform of the first computer; and one or more first-code-set-to-second-code-set mappings associated with the OS platform of the second computer; and wherein program instructions to locate the first-code-set-to-second-code-set mapping from a plurality of first-to-second-code-set mappings located on one or more network storage devices further comprise program instructions to add the located first-code-set-to-second-code-set mapping to the plurality of first-code-set-to-second-code-set mappings included in the second computer.

6. The computer program product according to claim 1, wherein program instructions to locate further comprise program instructions to locate the first-code-set-to-second-code-set mapping from a pool of preferred code set mappings based on one or more of frequency of use and most recently used.

7. The computer program product according to claim 1, wherein the request to convert is an invocation of an ICONV application programming interface.

8. The computer program product according to claim 1, wherein program instructions to locate further comprise program instructions to locate a default first-code-set-to-second-code-set mapping if a first-code-set-to-second-code-set mapping based on at least maintained code set mappings of the OS platform of the first computer is not found.

9. A computer system for converting character encoded data for an application that is ported from an operating system (OS) platform of a first computer to an OS platform of a second computer, the computer system comprising one or more processors, one or more computer readable memories, one or more computer readable tangible storage medium, and program instructions stored on at least one of the one or more storage medium for execution by at least one of the one or more processors via at least one of the one or more memories, the program instructions comprising:

program instructions to receive, on a second computer, an application ported from a first computer, the first and second computers having different first and second OS platforms;

program instruction to receive by the second computer, configuration information associated with the ported application that includes information corresponding to the first OS platform;

program instructions to execute, by the second OS platform, the ported application;

program instructions to receive, by the ported application, first character data encoded in a first code set;

program instructions to receive, by the second OS platform from the executing ported application, a request to convert the first character encoded data to a second character encoded data encoded in a second code set;

program instructions to locate, by the second OS platform, a first-code-set-to-second-code-set mapping based on at least the received configuration information associated with the ported application; and program instructions to convert, by the second OS platform, the first character encoded data to the second character encoded data using the located first-code-set-to-second-code-set mapping, such that the second character encoded data is equivalent to an output resulting from converting the first character encoded data on the first OS platform.

10. The computer system according to claim 9, wherein program instructions to locate further comprise program instructions to locate the first-code-set-to-second-code-set mapping from a plurality of first-code-set-to-second-code-set mappings, each first-code-set-to-second-code-set mapping associated with a different OS platform.

11. The computer system according to claim 9, wherein program instructions to locate further comprise program instructions to locate the first-code-set-to-second-code-set mapping from a plurality of first-code-set-to-second-code-set mappings located on one or more network storage devices.

12. The computer system according to claim 11,
wherein the second computer includes a plurality of first-code-set-to-second-code-set mappings comprising:
one or more first-code-set-to-second-code-set mappings associated with the OS platform of the first computer; and
one or more first-code-set-to-second-code-set mappings associated with the OS platform of the second computer; and
wherein program instructions to locate the first-code-set-to-second-code-set mapping from a plurality of first-code-set-to-second-code-set mappings located on one or more network storage devices further comprise program instructions to add the located first-code-set-to-second-code-set mapping to the plurality of first-code-set-to-second-code-set mappings included in the second computer.

* * * * *